United States Patent [19]

Persson

[11] Patent Number: 4,561,585

[45] Date of Patent: Dec. 31, 1985

[54] METHOD OF SPLICING METAL ELEMENTS BY MEANS OF EXPLOSION-WELDING

[75] Inventor: Per I. Persson, Nora, Sweden

[73] Assignee: Nitro Nobel A.B., Gyttorp, Sweden

[21] Appl. No.: 537,384

[22] PCT Filed: Jan. 21, 1983

[86] PCT No.: PCT/SE83/00015

§ 371 Date: Sep. 7, 1983

§ 102(e) Date: Sep. 7, 1983

[87] PCT Pub. No.: WO83/02579

PCT Pub. Date: Aug. 4, 1983

[30] Foreign Application Priority Data

Jan. 27, 1982 [SE] Sweden ............................ 8200437

[51] Int. Cl.[4] ........................................ B23K 20/08
[52] U.S. Cl. ........................................ 228/108; 228/2.5
[58] Field of Search ............... 228/2.5, 107, 108, 109

[56] References Cited

U.S. PATENT DOCUMENTS

| 3,024,526 | 3/1962 | Philipchuk et al. | 228/107 |
| 3,036,374 | 5/1962 | Williams | 228/108 |
| 3,455,017 | 7/1969 | Zondag | 228/108 |
| 3,797,098 | 3/1974 | Bement | 228/107 |
| 3,863,327 | 2/1965 | Legate et al. | 228/107 |

FOREIGN PATENT DOCUMENTS

| 2728409 | 4/1978 | Fed. Rep. of Germany | 228/108 |
| 10218 | 4/1968 | Japan | 228/107 |

Primary Examiner—Kenneth J. Ramsey
Attorney, Agent, or Firm—Dennison, Meserole, Pollack & Scheiner

[57] ABSTRACT

The invention relates to a method of welding together metal elements by means of explosion-welding. To limit the quantity of charge required, the charge is enclosed in an inert cylindrical medium serving as blasting medium and medium for transmitting shock waves. This shape eliminates the dependence on detonation speed and high-precision explosive charges can be selected, which can be detonated at small cross-sections. The cylindrical shape of the splicing material increases the tolerance limits for irregularity of the metal elements. A further embodiment of the invention also permits splicing from both sides of the elements, thus eliminating the need for supports to impede deformation.

13 Claims, 7 Drawing Figures

METHOD OF SPLICING METAL ELEMENTS BY MEANS OF EXPLOSION-WELDING

Metal elements such as sheet-metal and tubes can be spliced by various known methods of explosion-welding.

FIG. 1 shows schematically some such arrangements.

The explosive charge 1 accelerates either a splice plate 2 towards the elements 3 and 4 to be joined, or a part of one of the elements.

Since a relative large explosive charge must be used in relation to the thickness of the elements or the splicing strip, in order to achieve satisfactory cohesion, the splicing method according to FIG. 1 causes considerable deformation of the elements even if they are supported during the procedure.

In the arrangements shown in a and b where an explosive charge with low detonation speed must be used, the overlap must be made wider than is necessary for the strength of the joint. This is because the pressure relief from the edges of the charge affects the welding process in long, narrow charges so that with decreasing width, only edge effects are finally obtained. Even if the width is increased unjoined edge zones are obtained, see FIG. 2. In some cases such unjoined edge zones may give rise to gap corrosion.

In cases c and d in FIG. 1, a more rapid explosive charge can be used due to the angular arrangement, and a narrower overlap is obtained with satisfactory cohesion. However, these arrangements require great accuracy in preparing the joint and the elements must be fixed together in the correct position so that the angle set is correct along the entire joint. This entails practical difficulty in the case of long joins.

The object of the present invention is to eliminate these difficulties.

The explosive charge is given the simplest and most ideal shape, i.e. cylindrical, and is entirely encased in an inert medium so that the pressure relief and spread of fumes will be delayed until the explosion-welding process is complete.

The overlapping splicing material is also cylindrical so that even if the elements to be joined are somewhat irregular or placed slightly incorrectly, a region will always be obtained where the collision angle is correct for satisfactory adhesion. The relief of the pressure which still occurs with increasing distance from the centre of the charge through the inert medium is compensated by the increase in the angle set, due to the cylindrical shape. The arrangement is shown in FIG. 3.

In the cross-section shown 1 is the charge, 2 the splicing material, 3 and 4 the elements to be joined and 5 the inert material surrounding the charge 1.

Figure 1:
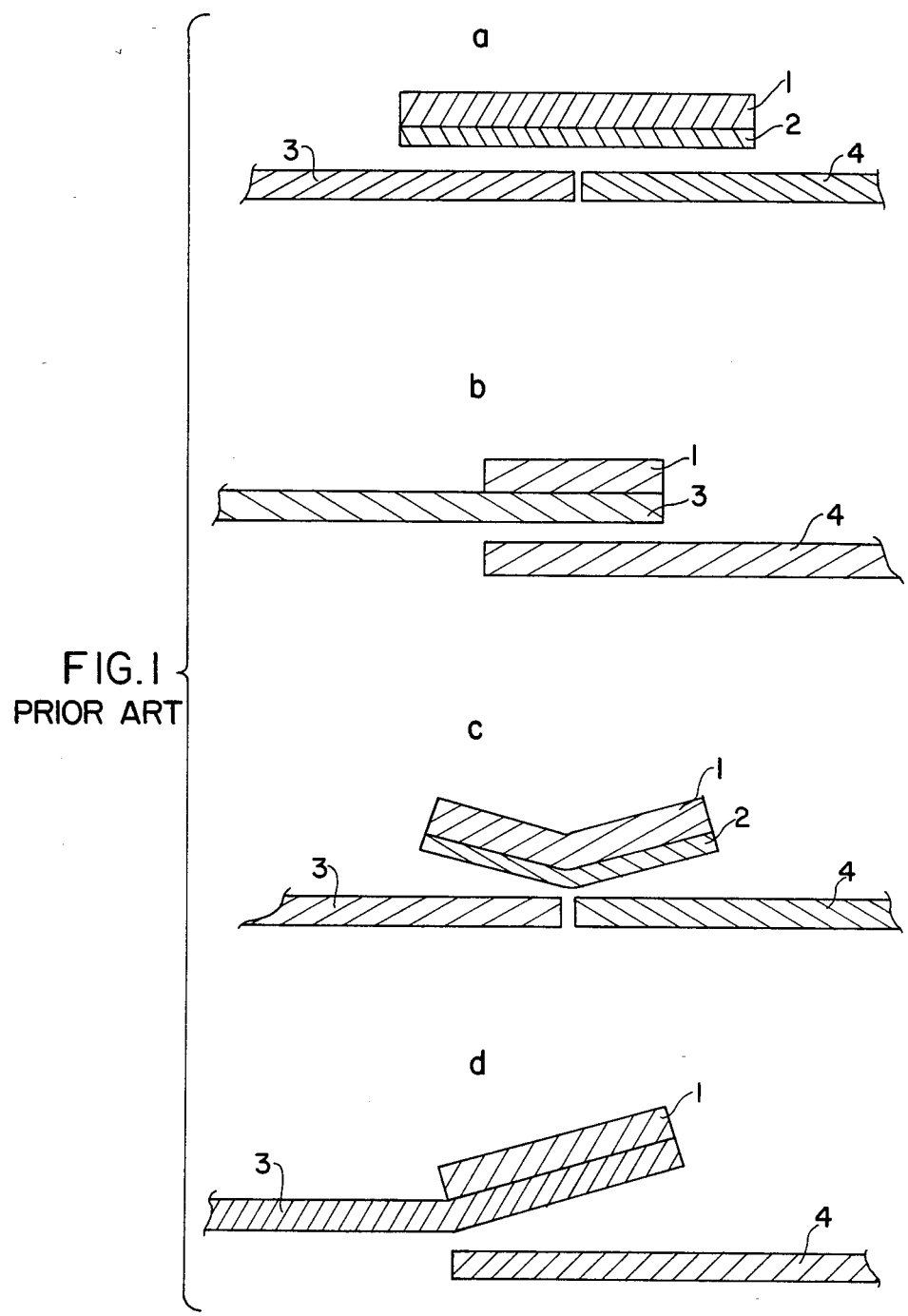
FIG. 1 shows various known methods of explosive welding.
Figure 2:
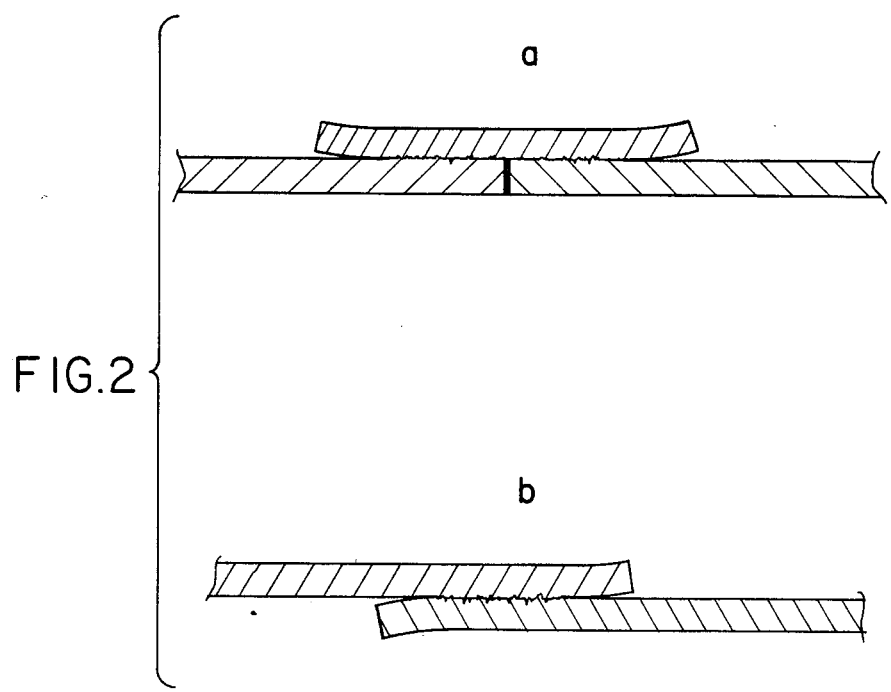
FIG. 2 illustrates the explosive weld obtained in some of the prior methods.
Figure 3:
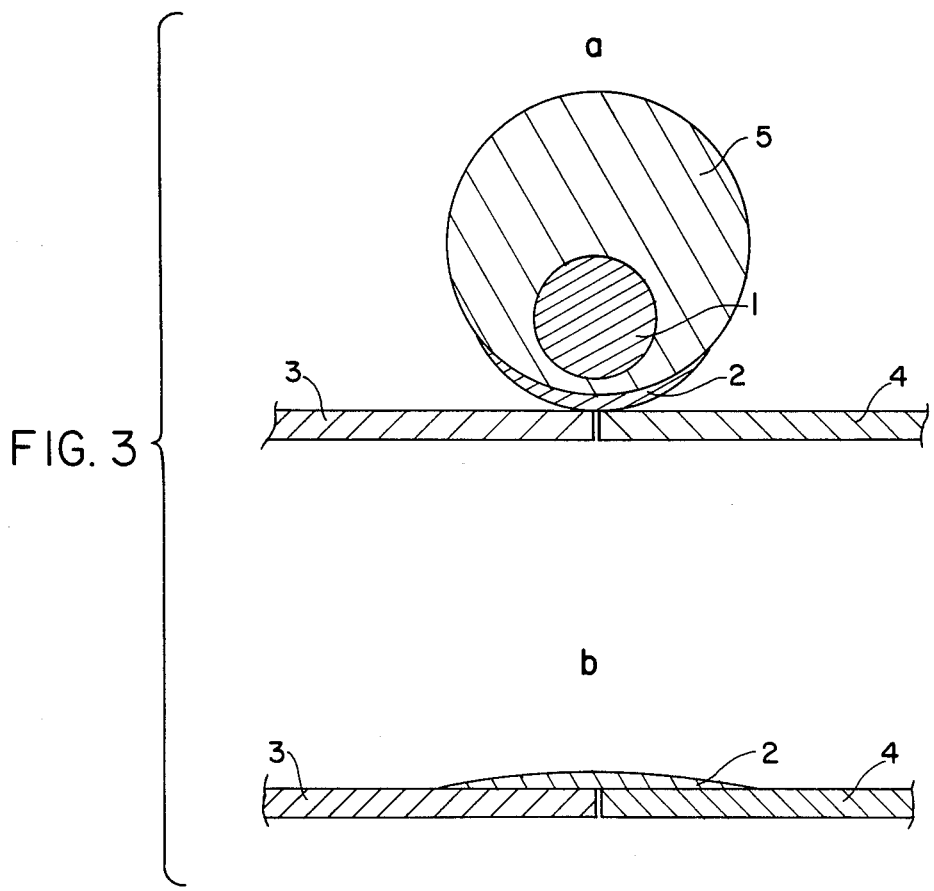
FIG. 3 shows one embodiment of the invention in which a cylindrical charged is enclosed within a cylindrical inert medium.

In FIG. 3 the splicing material has greater inner than outer radius. However, this is by no means necessary in principle, but facilitates adhesion of the edges and improves the appearance of the join (FIG. 3b).

The shock wave through the inert medium 5 has even further to go due to the eccentric location of the charge in relation to the surface of the splicing material and their different curvatures. Together with the curvature of the splicing material in relation to the metal elements, this determines the speed, both at right angles and parallel to the surface of the elements, at which the collision takes place. The explosion-welding process is thus not directly dependent on the detonation speed of the explosive, but on the detonation pressure, the material properties of the inert medium transmitting the shock wave, the splicing material and the geometry.

Explosives can thus be selected which have favourable properties with respect to slight critical diameter, manufacture, sensitivity, etc.

As for the inert material, practically any material may be selected which does not react with the explosive. In practice a material easy to make into rod form and favourable from an economic point of view is selected. Various types of plastic have been found to fulfil these requirements.

Figure 4:
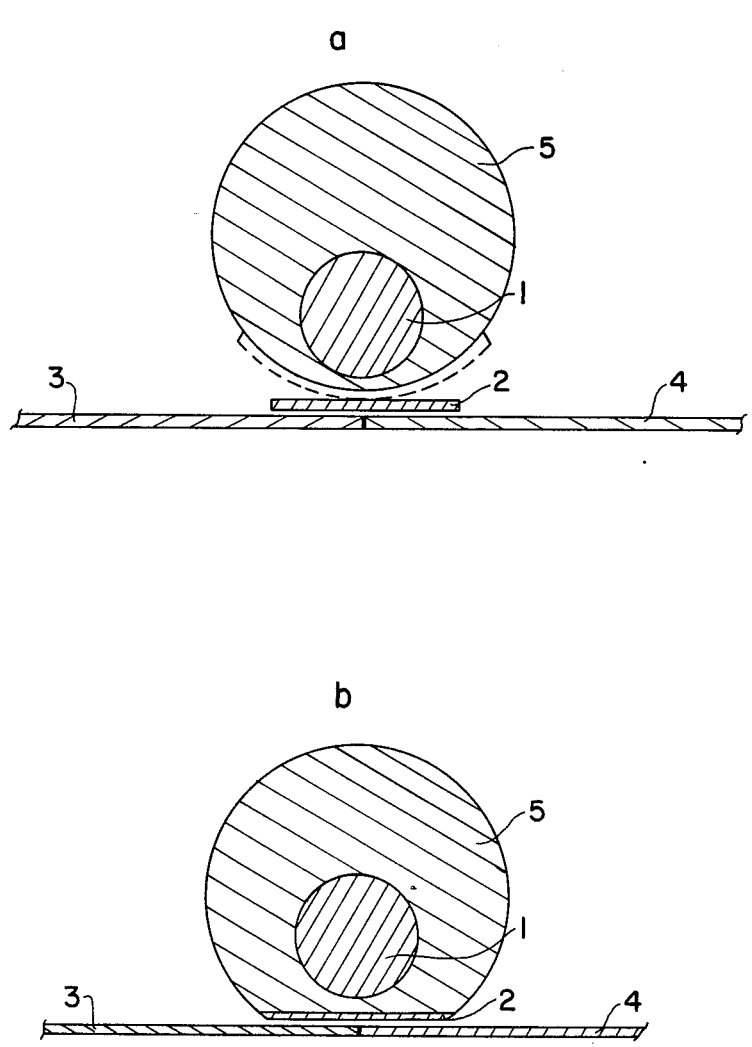
FIGS. 4 and 5, show various arrangements of the driver plate.

It is clear to anyone with experience of explosion-welding that component 2 in FIG. 3 may provide the drive plate for one or more plates beneath, being flat, for instance, or it may even consist of the part of the inert medium below the charge. This may be advantageous if thin or brittle material is to be joined. FIG. 4.

Figure 5:
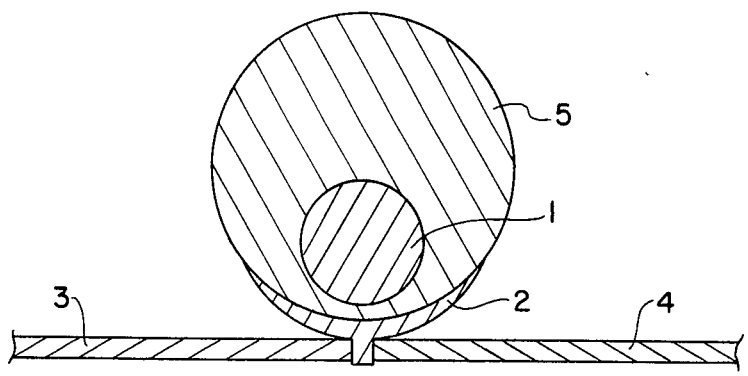

To position the charge system according to FIG. 3 the splicing piece may be provided with an abutment index inserted between the edges of the metal elements as shown in FIG. 5.

Figure 6:
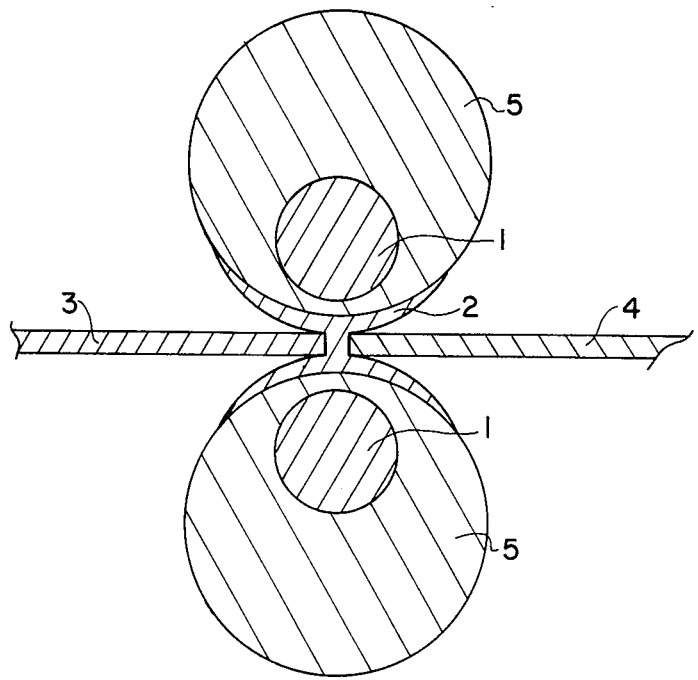
FIG. 6 shows an embodiment of the invention in which simultaneous explosive welding is effected on both sides of the work.

FIG. 6 shows a method of simultaneous explosion-welding from both sides of the elements, which can very well be done according to the method of the invention by using charges with high detonation speed and thus high precision. Firing from both sides of the element may be advantageous when splicing large-diameter elements such as pipe-lines above and below water where the application of supports to impede deformation is difficult and expensive. Another such case is the splicing of compound material where both the basic material and the plating material on one side thereof must be joined.

Figure 7:
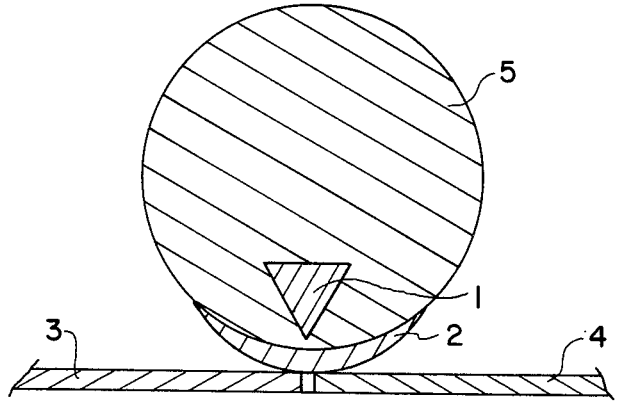
FIG. 7 shows the use of an explosive bonding charge of non-circular cross-section.

The explosive charge may also be given other shapes having a cross-section converging in the direction of the joint, such that the distance from the charge through the inert material to the metal elements increases as the lateral distance from the joint increases. In particular, a charge which is triangular in cross-section may be used, in which one apex of the triangle is directed toward the joint. Such a charge is shown in FIG. 7.

I claim:

1. In a method of explosion welding to join together metal elements utilizing an explosive charge adjacent to the joint and a splicing element between said charge and said joint, the improvement comprising:

(a) locating said charge in an inert material such that the distance from said charge through said inert material in the direction toward said joint is less than the distance from said charge through said inert material in the direction opposite to said joint; and (b) shaping said charge relative to said inert material and said metal elements such that the distance from said charge through said inert material to said metal elements increases as the lateral distance from said joint increases;

wherein said charge is substantially cylindrical in shape.

2. Method according to claim 1, wherein the inert material has substantially circular cross-section.

3. Method according to claim 2, wherein said charge is elongate and is placed in said inert material eccentrically, and said splicing element is arcuate in cross-section and is placed symmetrically with respect to said charge and said inert material immediately adjacent to said joint.

4. Method according to claim 2, wherein said inert material is cylindrical in shape.

5. Method according to claim 1, wherein splicing is performed from one side of the metal elements.

6. Method according to claim 1, wherein splicing is performed simultaneously from both sides of the metal elements.

7. Method according to claim 1, wherein the metal elements comprise flat sheets.

8. Method according to claim 1, wherein the metal elements are tubular.

9. Method according to claim 1, wherein a plurality of splicing elements is provided, the splicing element located closest to said inert material being of arcuate cross-section and being used as a drive body to accelerate one or more further splicing elements toward said joint to join together said metal elements.

10. Method according to claim 9, wherein said drive body comprises the part of said inert material between said charge and said joint.

11. Method according to claim 1, wherein said splicing member comprises the part of said inert material between said charge and said joint.

12. In a method of explosion welding to join together metal elements utilizing an explosive charge adjacent to the joint and a splicing element between said charge and said joint, the improvement comprising:

(a) locating said charge in an inert material such that the distance from said charge through said inert material in the direction toward said joint is less than the distance from said charge through said inert material in the direciton opposite to said joint; and (b) shaping said charge relative to said inert material and said metal elements such that the distance from said charge through said inert material to said metal elements increases as the lateral distance from said joint increases, wherein said charge is substantially triangular in cross-section, with one apex of said triangle being directed toward said joint, and said inert material is substantially cylindrical in shape.

13. In a method of explosion welding to join together metal elements utilizing an explosive charge adjacent to the joint and a splicing element between said charge and said joint, the improvement comprising:

(a) locating said charge in an inert material such that the distance from said charge through said inert material in the direction toward said joint is less than the distance from said charge through said inert material in the direction opposite to said joint; and (b) shaping said charge relative to said inert material and said metal elements such that the distance from said charge through said inert material to said metal elements increases as the lateral distance from said joint increases, wherein explosive charges are provided on both sides of the metal elements, and are simultaneously detonated.

* * * * *